United States Patent [19]

Kimura et al.

[11] 3,815,098

[45] June 4, 1974

[54] ZERO SUPPRESSOR CIRCUIT

[75] Inventors: Takehiko Kimura, Tokyo; Yoshiaki Niizawa, Kawasaki; Reiji Hirano, Yokohama, all of Japan

[73] Assignee: Canon Kabushiki Kaisha, Tokyo, Japan

[22] Filed: Sept. 11, 1972

[21] Appl. No.: 287,640

[30] Foreign Application Priority Data

Sept. 17, 1971 Japan .................. 46-72201

[52] U.S. Cl. .................. 340/172.5

[51] Int. Cl. .................. G11b 27/00

[58] Field of Search .................. 340/172.5, 324 R; 235/92 PL

[56] References Cited

UNITED STATES PATENTS

| | | | |
|---|---|---|---|
| 3,537,073 | 10/1970 | Sakoda et al. | 340/172.5 |
| 3,662,346 | 5/1972 | Tada | 340/172.5 |
| 3,732,545 | 5/1973 | Hatano et al. | 340/172.5 |

*Primary Examiner*—Raulfe B. Zache

*Attorney, Agent, or Firm*—Fitzpatrick, Cella, Harper & Scinto

[57] ABSTRACT

An electronic desk top calculator includes a displaying register for displaying input information and calculated result. In order to prevent undesired zeroes from displaying, a zero suppressor circuit is incorporated with the displaying register. The zero suppressor circuit is effectively realized by LSI circuit.

6 Claims, 5 Drawing Figures

| TPm | | Sm | | S10 | 9 | 8 | 7 | 6 | 5 | 4 | 3 | 2 | 1 |
|---|---|---|---|---|---|---|---|---|---|---|---|---|---|
| 0 | | – | | – | – | – | – | – | – | – | – | – | – |
| 1 | | 1 | | – | – | – | – | – | – | – | – | – | – |
| 2 | | 1 | | 1 | – | – | – | – | – | – | – | – | – |
| 3 | | 0 | | 1 | 1 | – | – | – | – | – | – | – | – |
| 4 | | 0 | | 0 | 1 | 1 | – | – | – | – | – | – | – |
| 5 | | 1 | | 0 | 0 | 1 | 1 | – | – | – | – | – | – |
| 6 | | 0 | | 1 | 0 | 0 | 1 | 1 | – | – | – | – | – |
| 7 | | 1 | | 0 | 1 | 0 | 0 | 1 | 1 | – | – | – | – |
| 8 | | 0 | | 1 | 0 | 1 | 0 | 0 | 1 | 1 | – | – | – |
| 9 | | 0 | | 0 | 1 | 0 | 1 | 0 | 0 | 1 | 1 | – | – |
| 10 | | 0 | | 0 | 0 | 1 | 0 | 1 | 0 | 0 | 1 | 1 | – |
| 11 | | 0 | | 0 | 0 | 0 | 1 | 0 | 1 | 0 | 0 | 1 | 1 |
| 12 | | 1 | | 0 | 0 | 0 | 0 | 1 | 0 | 1 | 0 | 0 | 1 |
| 13 | | 1 | | 1 | 0 | 0 | 0 | 0 | 1 | 0 | 1 | 0 | 0 |
| 14 | | 0 | | 1 | 1 | 0 | 0 | 0 | 0 | 1 | 0 | 1 | 0 |
| 15 | | 0 | | 0 | 1 | 1 | 0 | 0 | 0 | 0 | 1 | 0 | 1 |
| 16 | | 1 | | 1 | 0 | 1 | 1 | 0 | 0 | 0 | 0 | 1 | 0 |
| 17 | | 0 | | 1 | 1 | 0 | 1 | 1 | 0 | 0 | 0 | 0 | 1 |
| 18 | | 1 | | 1 | 1 | 1 | 0 | 1 | 1 | 0 | 0 | 0 | 0 |
| 19 | | 0 | | 1 | 1 | 1 | 1 | 0 | 1 | 1 | 0 | 0 | 0 |
| 20 | | 0 | | 0 | 1 | 1 | 1 | 1 | 0 | 1 | 1 | 0 | 0 |
| 21 | | 0 | | 0 | 0 | 1 | 1 | 1 | 1 | 0 | 1 | 1 | 0 |
| 22 | | 0 | | 0 | 0 | 0 | 1 | 1 | 1 | 1 | 0 | 1 | 1 |
| 23 | | 1 | | 0 | 0 | 0 | 0 | 1 | 1 | 1 | 1 | 0 | 1 |
| 24 | | 1 | | 1 | 0 | 0 | 0 | 0 | 1 | 1 | 1 | 1 | 0 |
| 25 | | 0 | | 1 | 1 | 0 | 0 | 0 | 0 | 1 | 1 | 1 | 1 |
| 26 | | 1 | | 1 | 1 | 1 | 0 | 0 | 0 | 0 | 1 | 1 | 1 |
| 27 | | 1 | | 1 | 1 | 1 | 1 | 0 | 0 | 0 | 0 | 1 | 1 |
| 28 | | 1 | | 1 | 1 | 1 | 1 | 1 | 0 | 0 | 0 | 0 | 1 |
| 29 | | 1 | | 1 | 1 | 1 | 1 | 1 | 1 | 0 | 0 | 0 | 0 |
| 30 | | 0 | | 1 | 1 | 1 | 1 | 1 | 1 | 1 | 0 | 0 | 0 |
| 31 | | 0 | | 0 | 1 | 1 | 1 | 1 | 1 | 1 | 1 | 0 | 0 |
| 32 | | 0 | | 0 | 0 | 1 | 1 | 1 | 1 | 1 | 1 | 1 | 0 |
| 33 | | 0 | | 0 | 0 | 0 | 1 | 1 | 1 | 1 | 1 | 1 | 1 |
| 34 | | 1 | | 0 | 0 | 0 | 0 | 1 | 1 | 1 | 1 | 1 | 1 |
| 35 | | 1 | | 1 | 0 | 0 | 0 | 0 | 1 | 1 | 1 | 1 | 1 |
| 36 | | 1 | | 1 | 1 | 0 | 0 | 0 | 0 | 1 | 1 | 1 | 1 |
| 37 | | 1 | | 1 | 1 | 1 | 0 | 0 | 0 | 0 | 1 | 1 | 1 |
| 38 | | 1 | | 1 | 1 | 1 | 1 | 0 | 0 | 0 | 0 | 1 | 1 |
| 39 | | 1 | | 1 | 1 | 1 | 1 | 1 | 0 | 0 | 0 | 0 | 1 |
| 40 | | 1 | | 1 | 1 | 1 | 1 | 1 | 1 | 0 | 0 | 0 | 0 |
| 41 | | 0 | | 1 | 1 | 1 | 1 | 1 | 1 | 1 | 0 | 0 | 0 |
| 42 | | 0 | | 0 | 1 | 1 | 1 | 1 | 1 | 1 | 1 | 0 | 0 |
| 43 | | 0 | | 0 | 0 | 1 | 1 | 1 | 1 | 1 | 1 | 1 | 0 |
| 44 | | 0 | | 0 | 0 | 0 | 1 | 1 | 1 | 1 | 1 | 1 | 1 |
| 45 | | 1 | | 0 | 0 | 0 | 0 | 1 | 1 | 1 | 1 | 1 | 1 |
| 46 | | 1 | | 1 | 0 | 0 | 0 | 0 | 1 | 1 | 1 | 1 | 1 |

ZERO SUPPRESSOR CIRCUIT

BACKGROUND OF THE INVENTION

The present invention relates to a zero suppressor circuit especially adapted to be produced as a LSI circuit.

There have been devised and demonstrated various zero suppressor circuits comprising discrete devices, but they have a common defect that they are large in size because of the space for discrete devices. When the number of discrete devices is reduced in order to provide a zero suppressor circuit compact in size, the circuit becomes complex and unreliable in operation.

The integration of a zero suppressor circuit consisting of discrete devices is extremely difficult, and its miniaturization is also limited.

SUMMARY OF THE INVENTION

According to the invention, there is provided a zero suppressor circuit comprising a first shift register for storing the numerical information, a second shift register in which the flip-flops in the digits corresponding to the digits in said first shift register storing the numerals other than zero are set, means for compressing the numerical information in said first shift register and transferring said compressed numerical information to said second shift register, means for circulating the contents in said first and second shift register in synchronism with each other, means for reducing the circulation loop of said second shift register by one bit, and means for suppressing the display of undesired zeros in response to the output signals of said second shift register.

One of the objects of the present invention is therefore to provide a zero suppressor circuit utilizing shift registers which is adapted to be produced as for example a MOS–LSI.

Another object of the present invention is to provide a zero suppressor circuit which uses the minimum number of devices such as gates, flip-flops in addition to the shift registers, which is adapted to be produced as a LSI and which may effectively suppress zeros only by the interruption of the bit information.

DESCRIPTION OF THE PREFERRED EMBODIMENTS

Figure 1:
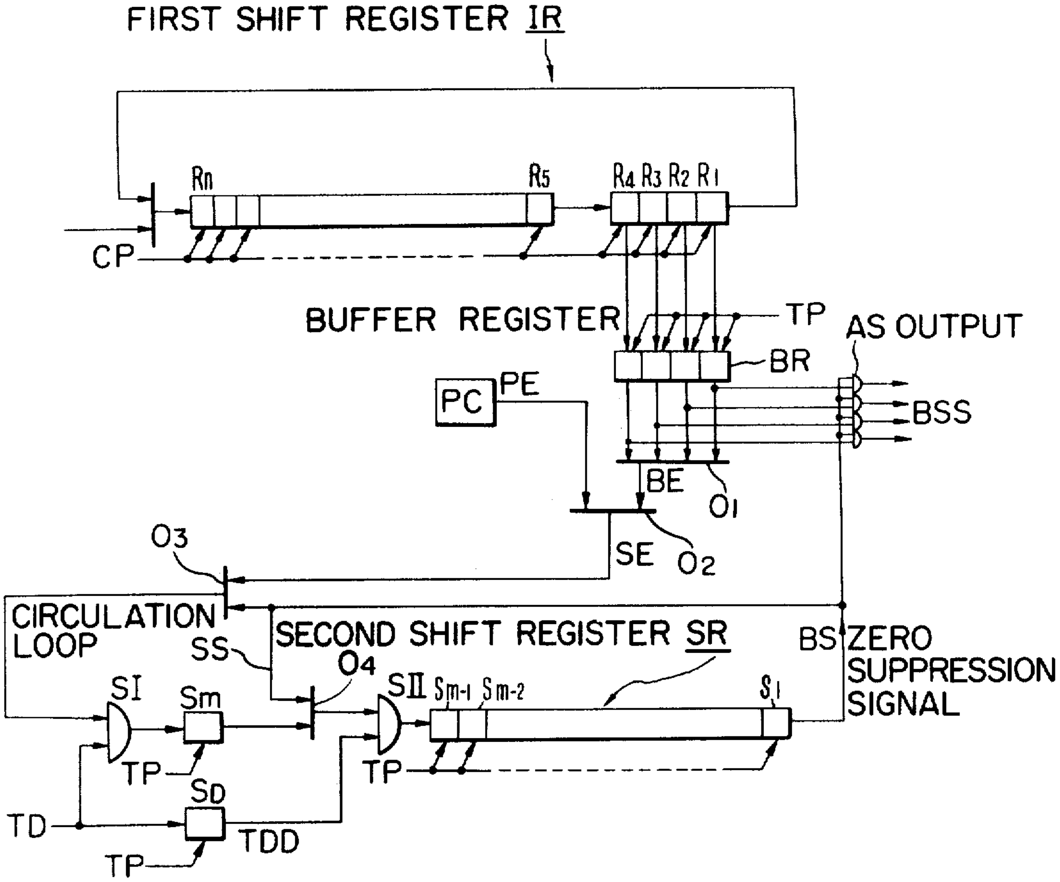
FIG. 1 is a block diagram of one preferred embodiment of the zero suppressor circuit of the present invention.

First referring to FIG. 1 the numerical information coded in the 8,4,2,1, binary code is stored in a first shift register IR with one word consisting of $n$ bits, and is circulated in response to the clock pulses CP so that a number of digits equal to $n/4$ are circulated in the shift register IR. The numerical information corresponding to one digit consisting of four bits is transferred and stored in a buffer register BR, and the information of the bits stored in the buffer register is transferred to the most significant bit position $Sm$ in a second shift register SR through OR gates $O_1$, $O_2$ and $O_3$ and an AND gate SI. The OR gate $O_2$ has a function of detecting the content stored in the buffer register BR and gives the output signal "0" when all of the bits stored in the buffer register are 0s and the output signal "1" when at least one of the bits stored in the buffer register BR is "1". The information about the decimal point is applied from a decimal-point circuit PC to a zero suppressor circuit so that the zero in the digit corresponding to the decimal point may not be suppressed.

In the zero suppression register SR the most significant bit position $Sm$ is spaced apart from the next significant bit $S_{m-1}$ by an OR gate $O_4$ and an AND gate SII. To the OR gate $O_4$ are applied the output signals from the most significant bit position $Sm$ and the least significant digit position $S_1$. To the AND gate SI are applied the output signal from the OR gate $O_3$ and the signal $T_D$ shown in FIG. 3, and to the AND gate SII are applied the output signal of the OR gate $O_4$ and the output signal TDD of a flip-flop SD to which are applied the signal TD and the control signal TP.

Figure 4:
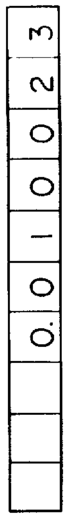
FIG. 4 is a schematic view of a display device displaying a zero-suppressed number.
Figure 5:
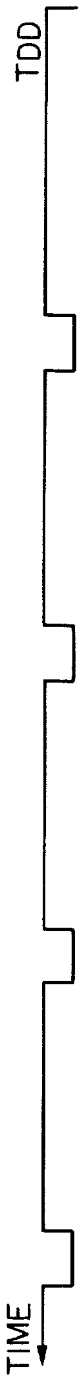
FIG. 5 is a chart used for the explanation of the shifts of the contents in a second shift register of the zero suppressor circuit shown in FIG. 1.

Next the mode of operation of the zero suppressor circuit will be described with a numeral 0.010023. As shown in FIG. 4, a display device is capable of displaying 10 digits, and zeros to be suppressed are three zeros in the three upper digits from the left. The first shift register IR for storing the numerical information has 11 digits, and the most significant digit is used for storing the information other than the numerical information. The second or zero suppression shift register SR has a length equal to one quarter of the first shift register IR in order to attain the synchronization in circulation, and comprises 11 flip-flops. The clock pulses CP and TP are applied as shift pulses to the shift registers IR and the buffer registers BR, rspectively, and one digit pulse TP is applied to each of the flip-flops in the second or zero-suppression shift register SR every four clock pulses.

Figure 2:
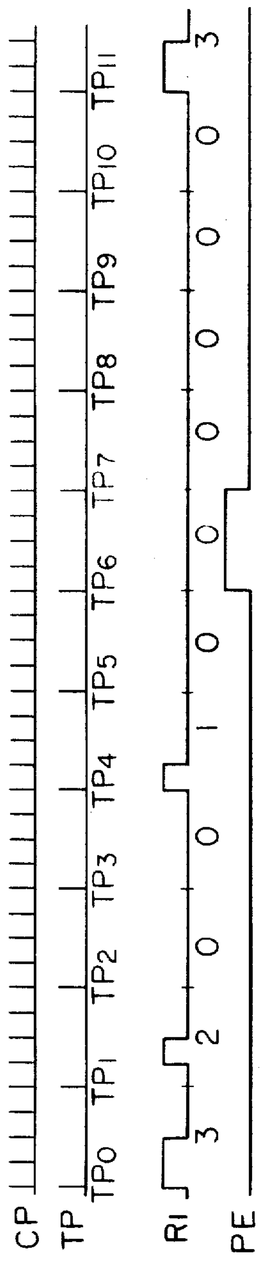
FIGS. 2 and 3 show the waveforms of the various signals in the zero suppressor circuit shown in FIG. 1 for the explanation of the mode of operation thereof.

It is assumed that at the reference time $TP_0$ the numerical information X0000.010023 is stored in the first shift register IR in the order named from the left to right positions. In response to the digit pulses $TP_1$, $TP_2$, . . . , the pulse signals as shown at $R_1$ in FIG. 2 are delivered from the first shift register IR, and the decimal point information indicated at PE in FIG. 2 is applied from the decimal point circuit PC so that the seventh digit from the right position or the least significant digit position may have the decimal point.

Figure 3:
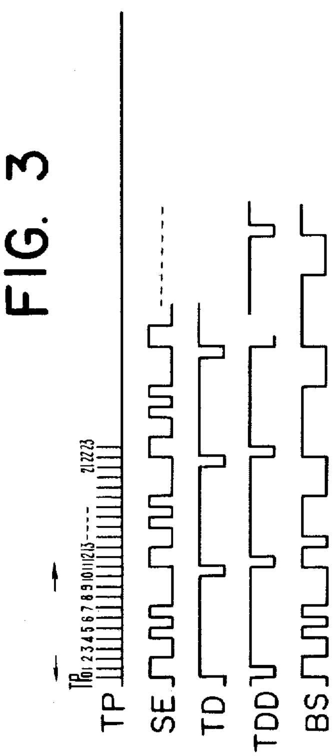

When the digit pulse $TP_{11}$ is applied, one word, that is, X0000.010023 is transferred as the output signal of the OR gate $O_2$ as shown in FIG. 3 at SE in the order of 1100101000X.

The information about X in the 11th digit or the most significant digit is not displayed so that the level of this information is low. The signal TD shown in FIG. 3 is at high level for a time interval equal to the one word length minus one bit length, that is for a time interval between the digit pulses $TP_0$ and $TP_{10}$ and is at low level for a time interval between $TP_{10}$ and $TP_{11}$, and cycles in the same manner as described above. The signal TDD lags behind the signal TD by a time equal to the time interval between the adjacent digit pulses TP.

During the time interval from $TP_0$ to $TP_1$ "3" in the least significant digit position is stored in $R_1$ – $R_4$ and then transferred into the buffer register BR in response to the digit pulse $TP_1$ and the bit information is simultaneously applied from the buffer register BR to the AND gate SI through the OR gates $O_1$, $O_2$, and $O_3$. The AND gate SI is opened in response to the signal TD shown in FIG. 3 so that the bit information is stored in the most significant bit position S*m* of the second shift register SR. The digit shift pulse $TP_1$ is also applied to the most significant bit position S*m* so that it is reset in response to the digit or timing pulse $TP_1$ and stores "1".

In response to the next digit timing pulse $TP_2$, "2" in the next lowest significant digit position in the first register IR is transferred into the most significant bit position S*m* through the buffer register BR so that S*m* stores "1" again while the bit information "1" previously stored in Sm is transferred to the AND gate SII through the OR gate $O_4$.

In response to the signal TDD shown in FIG. 3, the AND gate SII is opened so that the previously stored information "1" is transferred into the next higher significant bit position S*m*–1 in the second shift register SR. In response to the first pulse $TP_1$ after the signal TD shown in FIG. 3 has been applied, the flip-flop SD is set to store the signal "1", thus giving the high-level output signal. In response to the first digit pulse $TP_{11}$ after the signal TD falls from the high level to the low level, the output signal of the flip-flop SD falls to the low level, and in like manner in response to the output signal rises to the high level again. Thus the flip-flop SD gives the high-level output signal which lags behind by a time equal to the interval between the adjacent digit pulses with respect to one circulation time (one word length time equal to the time interval from $TP_0$ to $TP_{11}$). This high-level output signal is applied to the AND gate SII so that the latter is always opened for a time equal to one word length time but delayed by one digit pulse interval. It is this function of this AND gate SII that permits the numerical information 0010023 to be displayed with the zeros except one having the decimal point being suppressed as will be described in more detail hereinafter.

In response to each digit pulse TP following the digit pulse $TP_1$, the bit information of each digit position in the first shift register IR which is compressed to one quater in time length as compared with the information stored in each digit position in the first shift register, is transferred into the second shift register SR. During the time interval between the digit pulses $TP_6$ and $TP_7$, the signal PE representing the decimal point is fed from the decimal point circuit PC through the OR gates $O_2$ and $O_3$ and the AND gate SI to the most significant bit position S*m* in the second shift register SR, and is shifted into the next bit position S*m*–1 in response to the digit pulse $TP_8$. Thereafter the decimal point signal is shifted to the right in a similar manner. After one word length, the numerical information is stored in the second shift register SR in the order of 0001010011 from the left to the right position. The content X stored in the most significant digit position in the first shift register IR is converted into "0" and is stored in the most significant bit position S*m* in the second shift register SR because the AND gate SI is closed during the time interval between $TP_{10}$ and $TP_{11}$ as the signal TD which is applied to the AND gate SI falls from the high level to the low level during this time interval. If the AND gate SI is so designed as to open during one word length (that is, the signal TD remaining on the high level even during the time interval between $TP_{10}$ and $TP_{11}$), the information X per se is stored in the S*m* position. The information X is used for example to process the decimal point or to represent the plus or minus sign, and is not related with the number of digits to be displayed by a display device so that the AND gate SI is designed so as to store "0" in the S*m* position.

Therefore, the AND gate SI is not necessarily included in the zero suppressor circuit, but in practice the first shift register IR generally has an extra digit which is not needed to be displayed so that the AND gate SI is inserted in order to suppress this extra digit and is applied with the signal TD. When the signal TD is generated within the zero suppressor circuit, the signal TDD may be generated by only one flip-flop SD so that the zero suppressor circuit may be made simple in design.

The second word in the first shift register IR is transferred digit by digit from the least significant digit into the second shift register SR in a manner substantially similar to that described hereinabove, and the second shift register SR delivers the signal BS as shown in FIG. 3 from the least significant bit $S_1$. The signal BS is transmitted on a circulation loop SS and is applied to the AND gate SII through the OR gate $O_4$. During the interval between $TP_{11}$ and $TP_{12}$ (which corresponds to that between $TP_0$ and $TP_1$ in the previous cycle), the signal "1" representing the decimal digit "3" is applied to the OR gate $O_3$ from the OR gate $O_2$. The signal "1" is also applied to the OR gate $O_3$ from the least significant bit position $S_1$ in the second shift register SR. As a result either of the signals may be applied to the AND gate SI and stored in the most significant bit position S*m*. Hence the content in the least significant bit position $S_1$ in the second shift register SR is transferred into the most significant bit position S*m*. The content or signal "1" from the least significant bit position $S_1$ is also applied to the AND gate SII through the OR gate $O_4$, but the AND gate SII is closed for a time interval equal to the first time interval between the digit pulses ($TP_{11}$ and $TP_{12}$) after one word length time so that the signal "1" is not stored in the S*m*–1 position. In other words, the content in the S*m*–1 position remains unchanged. In the next time interval between $TP_{12}$ and $TP_{13}$, the AND gate SII is opened and kept opened for a time equal to one word length time minus one (= 10 digit pulses). The AND gate SI remains opened for a time equal to (one word length time – two digit pulses) = 9 digit pulses.

In summary, in response to the digit or timing pulse $TP_{13}$, the content "1" in the least digit position $S_1$ in the second shift register SR is transferred into the S*m* position so that the content "1" in the S*m* or $S_1$ position may be stored in the S*m*–1 position through the OR gate $O_4$. Two circulation shifts during the time intervals between $TP_{13}$ and $TP_{14}$ and between $TP_{14}$ and $TP_{15}$ are carried out. In response to the digit pulse $TP_{15}$, "1" is stored in the least significant bit position $S_1$ whereas "0"s in the most significant position S*m* and in the S*m*–1 position of the second shift register SR. In response to the digit pulse $TP_{16}$ the content in the $S_1$ position is transferred into the S*m* position, and the content "0" in the S*m* position and "1" in the $S_1$ position are applied to the OR gate $O_4$ so that the signal "1" is applied to the AND gate SII from the OR gate $O_4$. The AND gate SII is opened in response to the signal TDD, the signal "1" is passed to be stored in the $Sm-1$ position.

Therefore the content in the $Sm$ position changes from "0" to "1", and is transferred into the $Sm-1$ position. This "0" corresponds to 0 in the fourth digit from the least significant digit of the numerical information 0010023. This 0 must be displayed so that it has been converted into the binary signal "1".

The AND gate SII is opened for a time interval between $TP_{17}$ and $TP_{18}$ so that the content "1" in the $S_1$ position is stored in the $Sm-1$ position through the OR gate $O_4$ and the AND gate SII. The signal "1" is previously stored in the $Sm-1$ position so that the content "0" in the $Sm$ position should have been shifted and stored. However, the AND gate SII is opened so that the signal "1" from the $S_1$ position interrupts the signal "0" from the $Sm$ position and is stored into the $Sm-1$ position. This bit corresponds to 0 in the sixth digit from the least significant digit of the numerical information 0010023, and this 0 must be also displayed. 0 to be displayed in the third digit from the least significant digit is converted into the binary signal "1" during the time interval between $TP_{25}$ and $TP_{26}$ in a manner similar to that during the time interval between $TP_{17}$ and $TP_{18}$.

Thus 0s in the digits of the significant figure are converted into the signals "1"s during the circulation shift, and after all of 0s to be displayed have been converted into the signals "1"s, the conversion will not be made but the contents remain circulating.

The shift time is equal in both first and second shift registers SR and IR so that the same contents or signals are applied to the OR gate $O_3$ in response to every digit pulse TP. Therefore the output signals of the first shift register IR may not be considered when the content in the second shift register SR is once started to circulate.

The zero suppression signal BS produced in the manner described above and the output signals of the buffer register BR are applied to a group of AND circuits AS so that only the desired digits may be displayed while 0s in the higher digits which are not to be displayed are suppressed.

More particularly the zero suppressor circuit of the present invention may be directly incorporated in a dynamic display system in such a manner that the output signals of the group of the AND circuits AS are applied to a decoder (not shown), the output signals of the decoder are applied to the selected ones of a group of cathodes or segment electrodes (not shown), and the pulses are sequentially applied to the digits of the display device.

From the foregoing description it is seen that the zero suppressor circuit in accordance with the present invention is very simple in construction and is very effective in suppressing 0s in the higher digits so that they may not be displayed.

We claim:

1. A zero suppressor circuit comprising;

A first shift register for storing digital numerical information in a series of bit positions of different significance;

a second shift register having an input terminal, connected to receive the contents stored in said first shift register as transferred serially from the least significant digit thereof, said second shift register being arranged for storing a logic code "1" when a transferred digit is a numerical value other than zero and for storing another logic code "0" when the transferred digit is zero;

a first recirculating loop connected to recirculate the logic codes from the least significant bit position to the input terminal of the most significant bit position of the second shift register;

a second recirculating loop connected to recirculate the logic codes from the least significant bit position to the second most significant bit position of said second shift register; and AND gate means, having one input terminal connected to receive an output from the most significant bit position of said second register and an output from the least significant bit position of said second register through said second recirculating loop, said AND gate means having another input terminal connected to receive a control signal, the output of said AND gate means being connected to the second most significant bit position of said second register;

the logic code "0" of a bit position where the significant bit zero exists being thereby converted to the logic code "1" when the logic code "1" exists in a bit position next to and higher than a bit position where the significant bit zero to be displayed exists, and means operative to recirculate the logic codes stored in said second register to repeat the above-described procedure thereby to discriminate the digits to be displayed from other digits to be suppressed of said first shift register.

2. A zero suppressor circuit according to claim 1 wherein the circuit further comprises means for entering a logic code "1" into a bit position of said second shift register corresponding to a decimal point digit of said first shift register.

3. A zero suppressor circuit according to claim 1 wherein the circuit further comprises OR gate means, to which are applied output signals from the most significant bit position of said second shift register as well as from the least significant bit position thereof and means for applying an output of said OR gate means to one of the input terminals of said AND gate means.

4. A zero suppressor circuit according to claim 1 wherein the circuit further comprises second gate means connected to an input terminal of the most significant bit position of said second shift register for entering a logic code "0" into the most significant bit position of said register in response to the transfer thereto from said first shift register of extra digit information which does not serve for displaying.

5. A zero suppressor circuit according to claim 1 wherein the circuit further comprises means for recirculating and shifting the information while maintaining said first and second shift registers in a synchronized relationship; and third gate means, to which are applied the outputs of said first and second shift registers, for applying an output of said third gate means to a displaying means.

6. A zero suppressor circuit according to claim 1 wherein said circuit includes a control signal generating means operative to maintain said AND gate means closed during a digit shift interval following each bit circulation around said first recirculating loop.

* * * * *